Patented Mar. 21, 1950

2,501,200

UNITED STATES PATENT OFFICE 2,501,200

PROCESS FOR PRODUCTION OF MENTHANE ALDEHYDE

Richard B. Wearn, Birmingham, Ala., assignor to Food Machinery and Chemical Corporation, a corporation of Delaware No Drawing. Application December 26, 1946, Serial No. 718,610

4 Claims. (Cl. 260—598)

This invention relates to a methane aldehyde, particularly 2-p-menthane aldehyde, and processes for its production.

It is an object of this invention to produce menthane aldehyde, especially 2-p-menthane aldehyde, by processes which are simple and inexpensive. A further object is to produce aldehydes which are of value as intermediates and which have properties particularly adapted to perfumes and therapeutic inhalants. Additional objects will become apparent from a consideration of the following description and claims.

These objects are attained in accordance with the present invention wherein limonene or dipentene is hydrogenated to saturate the double bond in the side chain, and the resulting $\Delta^1$-p-menthene is reacted with carbon monoxide and hydrogen at elevated temperature and pressure in the presence of a hydrogenation catalyst to introduce an aldehyde group in the 2-position.

The invention may be more readily understood by a consideration of the following illustrative examples:

Example 1

A high pressure reactor of 685 cc. capacity was charged with 76 grams of $\Delta^1$-p-menthene (prepared by partial reduction of limonene over nickel-on-kieselguhr catalyst) and 5 grams of cobalt-on-kieselguhr catalyst. Carbon monoxide was introduced to 1250 p. s. i. and then hydrogen to a total pressure of 2300 p. s. i. at 26° C. Then agitation was begun, and the reaction was heated at 140–150° C. for 2 hours. After cooling, the charge was removed, filtered, and fractionally distilled. There was obtained 26 grams of 2-p-menthane aldehyde, B. P. 53–54° C./1–2 mm., $n_D^{30}$ 1.4526.

Example 2

A high-pressure hydrogenation bomb of 2240 cc. capacity was charged with 408 grams (3 moles) of d-limonene and 10 grams of cobalt-on-kieselguhr catalyst. Hydrogen was introduced to a pressure of 2000 p. s. i. (26°) and the bomb was agitated and heated at 140° C. for 1½ hours. During this time exactly 3 moles of hydrogen was absorbed. The bomb was then cooled to 100° C. and carbon monoxide was added to a total pressure of 2700 p. s. i. (corrected to 26° C.). Agitation was again started, and the bomb was heated at 140–150° C. for 3 hours, during which time the pressure dropped to 1360 p. s. i. (26°). The bomb was allowed to cool and the contents filtered and fractionally distilled. After a short forerun of reduced limonene, 195 grams (39 percent yield) of 2-p-menthane aldehyde was obtained. This product gave a positive Schiff test, a solid sodium bisulfite compound, and a solid semicarbazone derivative.

Physical constants: B. P. 91–93° C./8 mm., $n_D^{30}$ 1.4529, den. $_{20}$ 0.906.

Analysis of 2-p-menthane aldehyde: Calculated for $C_{11}H_{20}O$; C, 78.51; H, 11.98%. Found: C, 78.39%; H, 11.77%.

Characterization: The structure of this compound was established by mild oxidation to the corresponding 2-p-menthane carboxylic acid, followed by conversion to its aromatic analog, 2-methyl-5-isopropyl-benzoic acid. The amide of this acid was prepared and its melting point (138–139° C.) was identical with that reported in the literature.

Analysis of the amide: Calculated for $C_{11}H_{15}ON$: C, 74.54%; H, 8.53%. Found: C, 74.38%; H, 8.54%.

It is to be understood that the foregoing examples are representative merely of a few specific modifications of the present invention. They may be varied widely with respect to the individual reactants, the amounts thereof, and the conditions of reaction, without departing from the scope of this invention.

In place of limonene, either dextro- or levo-rotatory, or dipentene, it is contemplated that other alkyl-substituted, partially hydrogenated benzene derivatives may be employed. These benzene derivatives should, of course, contain at least one double bond in the ring. They may be substituted with a methyl group on the 1-position, as in the case of limonene and dipentene, or this group may occur in some other position on the partially hydrogenated benzene ring. In the same manner, in place of a methyl group other alkyl groups may be employed. Likewise, the side chain on the 4-position in the partially hydrogenated benzene ring may be changed to some other position on the ring and in place of the hydrocarbon radicals present thereon in limonene and dipentene other related hydrocarbon radicals may be employed.

As previously indicated, the reaction may be carried out by first saturating the side chain with hydrogen in the presence of a hydrogenation catalyst, followed by treatment with carbon monoxide and hydrogen in the presence of the same or a different hydrogenation catalyst. The first step of this reaction may be carried out conveniently by using as hydrogenation catalysts metals such as nickel, Raney nickel, nickel-on-kieselguhr, platinum, etc. Due to the relatively greater reactivity of the side chain double bond in limonene and dispentene as compared to the double bond in the 1,2-position in the ring, this reaction proceeds smoothly. For instance, when platinum is used as the catalyst this reaction proceeds smoothly at room temperature and 2 atmospheres pressure, going to completion in from 2 to 3 hours. When a nickel catalyst is used higher temperatures and pressures are in general advisable, for instance, a temperature of 75–150° C. and a pressure of 500 to 2000 pounds per square inch.

The second step in the reaction is simplified by this process, since the reactive side chain double bond has been blocked so the entering aldehyde group is introduced at the ring double bond. This step may be carried out at elevated temperatures and pressures employing a mixture of hydrogen and carbon monoxide gas and a hydrogenation catalyst. Hydrogenation catalysts which are particularly suitable for this second step are, for example, cobalt-on-kieselguhr and Raney cobalt.

The processes described in co-pending application Serial No. 685,241, filed July 20, 1946, by Lazier and Bordenca, are suitable for this second step, since it has been found that the rate of the reaction and the conditions of time, temperature and pressure are approximately the same as for the reaction described in the aforesaid copending application.

The time and expense of carrying on the 2-step process referred to previously has been substantially avoided by a unique process forming a preferred embodiment of this invention, which combines the two steps into a single operation. This process is illustrated by Example 2. While any one of several hydrogenation catalysts may be used for both steps of this reaction it has been found that cobalt-on-kieselguhr is particularly suitable for both steps. Thus, the reaction chamber may first be charged with limonene or dipentene, cobalt-on-kieselguhr, or a similar catalyst, and hydrogen is introduced to a pressure of 200 to 2000 pounds per square inch at a temperature of 75–150° C. Under the foregoing conditions the first step of the reaction is completed in 1 to 3 hours. Thereupon, carbon monoxide is pumped into the reaction chamber until the ratio of carbon monoxide to hydrogen is approximately 1 to 1, and the total pressure is in the range of 1000 to 4000 pounds per square inch at a temperature within the range of 75–150° C. or higher. The second phase of the reaction is completed in from 1 to 4 hours and the final product is filtered to remove catalyst, and fractionally distilled.

The modification of this invention which permits the 2-step reaction to be carried out in a single operation is of considerable importance as it completely avoids the necessity of isolating the $\Delta^1$-p-menthene and thereafter reacting this material with carbon monoxide and hydrogen to form the aldehyde. The advantages of combining these two steps in a single operation are self-evident, and the cost of the resulting product is considerably reduced.

The odor of the 2-p-menthane aldehyde is sweet and persistent, so this material is suitable for use in compounding perfumes. It has also been noted that the material has a pronounced cooling effect when inhaled. This cooling effect is presumably due to the fact that the product is related to certain broncho-constrictor compounds such as camphor and menthol and therefore possesses this property to a certain extent. As a result it may be used in therapeutic inhalant compositions.

As many apparently widely different embodiments of this invention may be made without departing from the spirit and scope hereof, it is to be understood that the invention is not limited to the specific embodiments hereof except as defined in the appended claims.

I claim:

1. A process which comprises reacting with hydrogen at elevated temperature and pressure a member selected from the class consisting of limonene and dipentene in the presence of a hydrogenation catalyst until the side chain double bond is saturated, then introducing carbon monoxide into the reaction chamber and subjecting the reaction mixture to elevated temperature and pressure until an aldehyde group is substituted on the 2-position of said reactant.

2. The process of claim 1 wherein the hydrogenation catalyst is cobalt-on-kieselguhr.

3. A process which comprises reacting limonene with hydrogen at a temperature within the range of 75° C. to 150° C. and a pressure within the range of 200 to 2000 pounds per square inch in the presence of a cobalt-on-kieselguhr catalyst for a sufficient time to saturate the side chain double bond, then introducing carbon monoxide into the reaction chamber and subjecting the reaction mixture to a temperature within the aforesaid range and a pressure within the range of 1000 to 4000 pounds per square inch until an aldehyde group is substituted on the 2-position of said reactant.

4. A process which comprises reacting dipentene with hydrogen at a temperature within the range of 75° C. to 150° C. and a pressure within the range of 200 to 2000 pounds per square inch in the presence of a cobalt-on-kieselguhr catalyst for a sufficient time to saturate the side chain double bond, then introducing carbon monoxide into the reaction chamber and subjecting the reaction mixture to a temperature within the aforesaid range and a pressure within the range of 1000 to 4000 pounds per square inch until an aldehyde group is substituted on the 2-position of said reactant.

RICHARD B. WEARN.

REFERENCES CITED

The following references are of record in the file of this patent:

UNITED STATES PATENTS

| Number | Name | Date |
|---|---|---|
| 1,879,767 | Schoeller et al. | Sept. 27, 1932 |
| 2,323,129 | Harvey | June 29, 1943 |
| 2,327,066 | Roelen | Aug. 17, 1943 |
| 2,437,600 | Gresham et al. | Mar. 9, 1948 |

FOREIGN PATENTS

| Number | Country | Date |
|---|---|---|
| 121,975 | Germany | Dec. 24, 1899 |